United States Patent Office 3,520,699
Patented July 14, 1970

3,520,699
FLAVOR COMPOSITION
Gerardus Johannes Henning, Vlaardingen, Netherlands, assignor to Lever Brothers Company, New York, N.Y., a corporation of Maine
No Drawing. Filed Oct. 7, 1966, Ser. No. 584,980
Claims priority, application Netherlands, Oct. 11, 1965, 6513164
Int. Cl. A23l 1/22
U.S. Cl. 99—140            8 Claims

ABSTRACT OF THE DISCLOSURE

A cheddar cheese flavor composition is provided by combining at least one aliphatic fatty acid selected from the group consisting of butyric, caproic, caprylic and capric acids, at least one phenol and at least one lactone of hydroxycarboxylic acids having from 4 to 22 carbon atoms in the molecule or precursors thereof. The addition of a ketone having a methyl group and an alkyl group with 2 to 15 carbon atoms provides a blue cheese flavor.

---

The invention relates to a flavor composition and to a method of preparing flavored foodstuffs, in particular foodstuffs having a cheese flavor.

Accordingly, the present invention provides a flavor composition which comprises a mixture of one or more fatty acids, one or more phenols, and one or more lactones or precursors thereof of hydrocarboxylic acids.

The invention also provides a method of preparing a cheese flavored foodstuff by incorporating in the foodstuff the aforementioned flavor composition.

By "precursors," whenever used in this specification, we mean substances which, when incorporated in the foodstuff, are capable of giving rise to the respective flavour ingredient with which the precursor is associated.

The fatty acids that may be used in the flavor composition are those aliphatic fatty acids having unbranched chains containing 4, 6, 8 or 10 carbon atoms in the molecule, namely: butyric, caproic, caprylic and capric acids.

The phenols that may be used in the flavor composition according to the present invention are preferably phenol, p-cresol and guaiacol. However the following phenols may also be used: o-cresol, m-cresol, m-ethylphenol, p-ethylphenol, 3,5-dimethylphenol, m-propylphenol, 3-methyl-5 ethylphenol, m-methoxyphenol, 2,6-dimethoxyphenol, p-methyl-guaiacol, p-ethylguaiacol and alpha-naphthol.

The lactones or precursors thereof suitable for use in the flavor composition according to the present invention are those derived from aliphatic gamma, delta, or epsilon hydroxycarboxylic acids having from 4 to 22 carbon atoms in the molecule.

The flavor obtained when the above composition is incorporated in the foodstuff closely resembles that of cheddar cheese. However it has further been discovered that by additionally incorporating one or more ketones, or precursors thereof such as beta-keto acids or their corresponding esters, the ketones having a methyl group and an alkyl group with 2 to 15 carbon atoms, a blue cheese flavor may be obtained.

The amounts of each component of the flavor composition which may be incorporated in the foodstuff may be varied to suit particular requirements, but these amounts are nevertheless small. When imparting a cheddar cheese flavor to a fat-containing foodstuff, the amount of each component that may be employed, expressed in mg. per kg. fat present in the foodstuff, are preferably as follows: from 0.1 to 5 mg. of each phenol; up to 100 mg. of each lactone or a precursor thereof; up to 600 mg. of each fatty acid; and where the flavor required is that resembling blue cheese, up to 400 mg. of each methyl ketone or a precursor thereof.

The flavor composition can suitably be incorporated into the foodstuff by admixture with a composition consisting of the respective ingredients, or preferably by admixture with a solution, dispersion or emulsion of the composition in an edible oil and/or water.

When the foodstuff, for example pastry, that is to be flavored has already been shaped, the shaped foodstuff may suitably be sprayed with an oil solution or a water emulsion of the flavor composition.

The flavor compositions may usefully be employed in the flavoring of powders, sauces and sandwich spreads for example processed cheese.

The invention may be illustrated by reference to the following examples.

EXAMPLE I

A composition for imparting a cheddar cheese flavor to foodstuffs was perpared by dissolving the following components in 1,000 g. refined groundnut oil:

| | |
|---|---|
| Lactone of delta-hydroxydodecanoic acid _____g__ | 20 |
| Lactone of gamma-hydroxybutric acid _____g__ | 4 |
| Lactone of gamma-hydroxyoctanoic acid _____g__ | 10 |
| Lactone of epsilon-hydroxydodecanoic acid ____g__ | 40 |
| Butyric acid _____g__ | 250 |
| Caproic acid _____g__ | 300 |
| Caprylic acid _____g__ | 200 |
| Capric acid _____g__ | 250 |
| Phenol _____mg__ | 250 |
| p-Cresol _____mg__ | 250 |
| Guaiacol _____mg__ | 400 |

EXAMPLE 2

A composition for providing a foodstuff with a flavor similar to that of bule cheese was prepared by incorporating in 1,000 g. refined groundnut oil the substances listed in Example I, and in addition the following ketones:

| | G. |
|---|---|
| Methyl propyl ketone _____ | 100 |
| Methyl pentyl ketone _____ | 250 |
| Methyl heptyl ketone _____ | 200 |
| Methyl nonyl ketone _____ | 40 |
| Methyl undecyl ketone _____ | 10 |
| Methyl tridecyl ketone _____ | 10 |

EXAMPLE 3

A processed cheese was prepared in the following manner.

540 g. purified coconut oil, to which 0.2% soybean lecithin and 0.67% anatto had been added, was emulsified at 50° C. in 12 litres skimmed milk by means of a centrifugal stirrer. 67 ml. concentrated lactic acid, containing 80% monomeric lactic acid, was added to the emulsion at 35° C., the pH then being 4.65. The clotted milk was filtered through a cloth and pressed to a dry matter content of 48%. The following substances were then added to the curd:

| | Percent |
|---|---|
| Polyphosphate _____ | 2.5 |
| Potassium sorbate _____ | 0.2 |
| Casein hydrolysate _____ | 3.0 |

The curd was mixed with the added substances in a Küstner melting tank and subsequently melted by heating at 80° C. for 10 minutes under a vacuum of 34 cm. mercury, while mixing with a high speed stirrer. After the melting operation, 0.04% of the solution in oil described in Example I was added, and on solidification, a processed cheese was obtained with a good consistency and an excellent taste, which was virtually indistinguishable in flavour from a processed cheese prepared from cheddar cheese.

EXAMPLE 4

Example 3 was repeated except that 0.04% of the oil solution described in Example 2 was added in place of that described in Example 1. A processed cheese of excellent consistency, having the taste and flavor similar to that of blue cheese was obtained.

EXAMPLE 5

A processed cheese was prepared as follows.

To 12 litres milk at 35° C. with a fat content of 4.5%, 67 ml. concentrated lactic acid, containing 80% of the monomeric lactic acid, was added. The curd thereby obtained was filtered through a cloth and pressed to a dry matter content of 48.2%. The following substances were then added to the curd:

| | Percent |
|---|---|
| Sodium citrate | 2.5 |
| Potassium sorbate | 0.2 |
| Casein hydrolysate | 2.0 |

After premixing, the ingredients were melted by heating the mixture at 90° C. under a vacuum of 20 cm. mercury for 10 minutes. 0.04% of the oil solution of Example I was finally stirred into the mixture. The processed cheese so obtained had an excellent cheddar flavor.

EXAMPLE 6

Processed cheese was also prepared generally according to the methods described in Examples 3 and 5, using various concentrations of the flavor ingredients as set out below. The following ranges of concentrations of each ingredient, expresser as mg. per kg. fat in the finished processed cheese, were used:

| | Mg. |
|---|---|
| Lactone of delta-hydroxy dodecanoic acid | 1–50 |
| Lactone of gamma-hydroxy butyric acid | 1–25 |
| Lactone of gamma-hydroxy octanoic acid | 1–25 |
| Lactone of epsilon-hydroxy dodecanoic acid | 1–50 |
| Butyric acid | 100–500 |
| Caproic acid | 10–600 |
| Caprylic acid | 10–400 |
| Capric acid | 10–600 |
| Phenol | 0.1–2.5 |
| p-Cresol | 0.1–2.5 |
| Guaiacol | 0.1–5.0 |

Some of the flavor compositions were further improved by the addition of 0.002 mg. cis-hept-4-ene-al per kg. of the fat.

EXAMPLE 7

Experiments corresponding with those described in Example 6 were also carried out for preparing fat-containing foodstuffs having a blue cheese flavor. The components listed in Example 6 were accordingly supplemented by the addition of one or more of the following ketones in amounts within the ranges stated, which are expressed as mg. kg. of the fat in the finished fat-containing foodstuff:

| | Mg. |
|---|---|
| Methyl proply ketone | 10–100 |
| Methyl pentyl ketone | 10–200 |
| Mehyl heptyl ketone | 10–200 |
| Methyl nonyl ketone | 2–60 |
| Methyl undecyl ketone | 1–25 |
| Methyl tridecyl ketone | 1–25 |

What is claimed is:

1. A cheddar cheese flavor composition which comprises a mixture of:
  (i) from 10–6,000 parts by weight of a least one fatty acid selected from the group consisting of butyric, caproic, caprylic and capric acid,
  (ii) from 1–5 parts by weight of at least one phenol selected from the group consisting of phenol, p-cresol, guaiacol, o-cresol, m-cresol, m-ethylphenol, p-ethylphenol, 3,5-dimethylphenol, m-propylphenol, 3-methyl-5 ethylphenol, m-methoxyphenol, 2,6-dimethoxyphenol, p-methylguaiacol, p-ethylguaiacol and alpha-naphthol, and
  (iii) from 10–1,000 parts by weight of at least one lactone or precursor thereof of an aliphatic hydroxycarboxylic acid having from 4 to 22 carbon atoms in the molecule, said hydroxycarboxylic acid being selected from the group consisting of the gamma-, the delta-, and the epsilon- isomer thereof.

2. A blue cheese flavor composition which comprises a mixture of:
  (i) from 10–6,000 parts by weight of at least one fatty acid selected from the group consisting of butyric, caproic, caprylic and capric acid,
  (ii) from 1–5 parts by weight of at least one phenol selected from the group consisting of phenol, p-cresol, guaiacol, o-cresol, m-cresol, m-ethylphenol, p-ethylphenol, 3,5-dimethylphenol, m-propylphenol, 3-methyl-5 ethylphenol, m-methoxyphenol, 2,6-dimethoxyphenol, p-methylguaiacol, p-ethylguaiacol and alpha-naphthol,
  (iii) from 10–1,000 parts by weight of at least one lactone or precursor thereof of an aliphatic hydroxycarboxylic acid having from 4 to 22 carbon atoms in the molecule, said hydroxycarboxylic acid being selected from the group consisting of the gamma-, the delta-, and the epsilon-isomer thereof, and
  (iv) from 10–4,000 parts by weight of at least one ketone or a precursor thereof, the ketone having in the molecule a methyl group, and an alkyl group with 2 to 15 carbon atoms.

3. The flavor composition of claim 1, dispersed in a liquid carrier selected from the group consisting of oil and water.

4. The flavor composition of claim 2, dispersed in a liquid carrier selected from the group consisting of oil and water.

5. A foodstuff containing the flavor composition of claim 1.

6 A foodstuff containing the flavor composition of claim 2.

7. A fat-containing foodstuff when mixed with a cheddar cheese flavor composition which comprises the following components, in amounts expressed as mg. per kg. of the fat:
  (i) 10–600 mg. of a fatty acid selected from the group consisting of butyric, caproic, caprylic and capric acid,
  (ii) from 0.1 to 5 mg. of a phenol selected from the group consisting of phenol, p-cresol, guaiacol, o-cresol, m-cresol, m-ethylphenol, p-ethylphenol, 3,5-dimethylphenol, m-propylphenol, 3-methyl-5 ethylphenol, m-methoxyphenol, 2,6-dimethoxyphenol, p-methylguaiacol, p-ethylguaiacol and alpha-naphthol, and
  (iii) 10–100 mg. of a lactone or precursor thereof of an aliphatic hydroxycarboxylic acid having from 4 to 22 carbon atoms in the molecule, said hydroxycarboxylic acid being selected from the group consisting of the gamma-, the delta- and the epsilon isomer thereof.

8. A fat-containing foodstuff when mixed with a blue cheese flavor composition which comprises the following components, in amounts expressed as mg. per kg. of the fat:
  (i) 10–600 mg. of a fatty acid selected from the group consisting of butyric, caproic, caprylic and capric acid,
  (ii) from 0.1 to 5 mg. of a phenol selected from the group consisting of phenol, p-cresol, guaiacol, o-cresol, m-ethylphenol, p-ethylphenol, 3,5-dimethylphenol, m-propylphenol, 3-methyl-5 ethylphenol, m- methoxyphenol, 2,6-dimethoxyphenol, p-methylguaiacol, p-ethylguaiacol and alpha-naphthol, and (iii) 10–100 mg. of a lactone or precursor thereof of an aliphatic hydroxycarboxylic acid having from 4 to 22 carbon atoms in the molecule, and said hydroxycarboxylic acid being selected from the group consisting of the gamma-, the delta- and the epsilon- isomer thereof.

(iv) 1–400 mg. of a ketone or a precursor thereof, the ketone having in the molecule a methyl group, and an alkyl group with 2 to 15 carbon atoms.

References Cited

UNITED STATES PATENTS

| | | | |
|---|---|---|---|
| 2,819,169 | 1/1968 | Boldingh et al. | 99—123 |
| 2,903,364 | 9/1959 | Wode et al. | 99—123 |
| 2,955,041 | 10/1960 | Broderick et al. | 99—140 |
| 3,034,902 | 5/1962 | Bavisotto | 99—140 |

FOREIGN PATENTS 751,476  6/1956  Great Britain.

OTHER REFERENCES

Merory: Food Flavorings, Aui Publishing Co., 1960, Westport, Conn., pp. 166–167.

Food Processing: Chemicals used in National Research Council Publication No. 1274, 1965, pp. 103, 118, 130 and 147.

Jacobs: Synthetic Food Adjuncts, Van Norstrand Co., New York, 1947, p. 168.

MAURICE W. GREENSTEIN, Primary Examiner

U.S. Cl. X.R.

99—117, 144